3,463,808
NAPHTHALENE DERIVATIVES
Peter Anthony Bond and Ralph Howe, Macclesfield, England, assignors to Imperial Chemical Industries Limited, London, England, a corporation of Great Britain
No Drawing. Filed Dec. 30, 1964, Ser. No. 422,400
Claims priority, application Great Britain, Jan. 20, 1964, 2,437/64
Int. Cl. C07c 91/04, 91/00, 95/08
U.S. Cl. 260—479    4 Claims

ABSTRACT OF THE DISCLOSURE

There are disclosed certain 1-(2-naphthyl)-2-aminoethanol derivatives which are β-adrenergic blocking agents. These derivatives carry a hydroxy or acyloxy substituent in the 5–8 position of the naphthyl radical. Pharmaceutical compositions containing these derivatives are also disclosed. Representative compounds are 1-(7-acetoxy-2-naphthyl)-2-isopropylaminoethanol, 1-(7-hydroxy-2-naphthyl)-2-isopropylaminoethanol, and the acid-addition salts thereof.

---

This invention relates to new naphthalene derivatives which are β-adrenergic blocking agents and which are therefore of value in the treatment or prophylaxis of hypertension, phaeochromocytoma, and heart diseases, for example angina pectoris, cardiac arrhythmias and coronary insufficiency.

According to the invention we provide naphthalene derivatives of the formula:

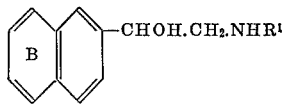

wherein $R^1$ stands for hydrogen or an alkyl, hydroxyalkyl, cycloalkyl, alkenyl or aralkyl radical, and ring B bears a hydroxy or acyloxy substituent, or it bears two alkoxy substituents, and wherein the naphthalene nucleus optionally bears one or more additional substituents, and the esters thereof, and the salts thereof.

As a suitable value for $R^1$ when it stands for an alkyl radical there may be mentioned, for example, a straight- or branched-chain alkyl radical of not more than 10 carbon atoms, optionally bearing one or more hydroxy radicals, for example the isopropyl, 2-hydroxy-1,1-dimethylethyl, t-butyl or 1-methyloctyl radical. As a suitable value for $R^1$ when it stands for a cycloalkyl radical there may be mentioned, for example, a cycloalkyl radical of not more than 6 carbon atoms, for example the cyclopentyl radical. As a suitable value for $R^1$ when it stands for an alkenyl radical there may be mentioned, for example, an alkenyl radical of not more than 10 carbon atoms, for example the allyl radical. As a suitable value for $R^1$ when it stands for an aralkyl radical there may be mentioned, for example, an aralkyl radical of not more than 15 carbon atoms, for example a phenylalkyl radical of not more than 15 carbon atoms, for example the 1-methyl-3-phenylpropyl radical.

As a suitable acyloxy substituent in the benzene ring B there may be mentioned, for example, an alkanoyloxy radical, for example an alkanoyloxy radical of not more than 5 carbon atoms, for example the acetoxy radical.

One particularly preferred embodiment of this invention consists of those of the naphthalene derivatives of the invention in which the ring B bears either a hydroxy substituent at the 7-position (relative to the ethanolamine substituent at the 2-position) or an acyloxy substituent at the said 7-position. We have made the surprising discovery that, although all the naphthalene derivatives of this invention are active as β-adrenergic blocking agents, the compounds of the last-named sub-group are much more active than the remainder of the naphthalene derivatives of this invention.

When the ring B bears two alkoxy substituents each one may, for example, be an alkoxy radical of not more than 5 carbon atoms, for example the methoxy radical.

As a suitable optional additional substituent in the naphthalene nucleus there may be mentioned, for example, an alkoxy radical of not more than 5 carbon atoms, for example the methoxy radical.

As suitable esters of the invention there may be mentioned O-esters derived by the esterification of the side chain hydroxy radical of the corresponding naphthalene derivative and derived from an acid of the formula $R^2 \cdot COOH$ wherein $R^2$ stands for an alkyl, alkenyl, aryl or aralkyl radical, for example an alkyl, alkenyl, aryl or aralkyl radical of not more than 10 carbon atoms, and the salts thereof.

As suitable salts of the invention there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates, 1,1'-methylene bis(2-hydroxy-naphthoates) or citrates.

As specific compounds of the present invention there may be mentioned, for example, 1-(7-acetoxy-2-naphthyl)-2-isopropylaminoethanol,
1-(7-hydroxy-2-naphthyl)-2-isopropylaminoethanol,
1-(6-hydroxy-2-naphthyl)-2-isopropylaminoethanol,
1-(7-acetoxy-2-naphthyl)-2-(1-methyl-3phenylpropylamino)ethanol,
1-(7-hydroxy-2-naphthyl)-2-t-butyl-aminoethanol,
2-cyclopentylamino-1-(7-hydroxy-2-naphthyl)ethanol,
1-(7-acetoxy-2-naphthyl)-2(1-methyloctylamino)-ethanol,
1-(6,7-dimethoxy-2-naphthyl)-2-isopropylamino-ethanol,
1-(6,7-dimethoxy-2-naphthyl)-2-t-butylaminoethanol, and
1-[6-(or 7-)hydroxy-7-(or 6-) methoxy-2-naphthyl]-2-isopropylaminoethanol, and the salts thereof.

According to a further feature of the invention we provide a process for the manufacture of those of the naphthalene derivatives of the invention wherein $R^1$ stands for a radical of the formula $-CHR^3R^4$, wherein $R^3$ stands for hydrogen or an alkyl radical of not more than 5 carbon atoms and $R^4$ stands for an alkyl, alkenyl, aryl or aralkyl radical, which comprises the interaction of an amino derivative of the formula:

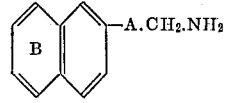

wherein A stands for the group CO or CHOH, B has the meaning stated above, and the naphthalene nucleus optionally bears one or more additional substituents, with a carbonyl compound of the formula $R^3 \cdot CO \cdot R^4$, wherein $R^3$ and $R^4$ have the meanings stated above, under reducing conditions.

Suitable reducing conditions are those provided by the presence of hydrogen and a hydrogenation catalyst, for example platinum, in a diluent or solvent, for example ethanol or acetic acid, and/or, in the case where, in the said carbonyl compound, $R^3$ stands for an alkyl radical of not more than 5 carbon atoms, in an excess of the carbonyl compound, or by the presence of an alkali metal borohydride, for example sodium borohydride, in a diluent or solvent, for example aqueous methanol, and/or in an excess of the said carbonyl compound.

It is to be understood that the said amino derivative may be generated in situ, for example by the reduction of the corresponding diazoacyl compound, and simultaneously or subsequently reduced in the presence of the said carbonyl compound. The last-named reduction may be effected by means of hydrogen and a hydrogenation catalyst, for example platinum, or by means of sodium borohydride.

According to a further feature of the invention we provide a process for the manufacture of the naphthalene derivatives of the invention, which comprises the reduction of a compound of the formula:

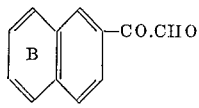

or a hydrate thereof, wherein B has the meaning stated above and the naphthalene nucleus optionally bears one or more additional substituents, in the presence of an amine of the formula $NH_2R^1$, wherein $R^1$ has the meaning stated above, or a salt thereof.

The last-named reduction may be carried out by catalytic hydrogenation, for example hydrogenation in the presence of a platinum catalyst. The catalytic hydrogenation may be carried out in an inert diluent or solvent, for example methanol or ethanol, it may be carried out at atmospheric pressure or elevated pressure, and it may be carried out at ambient temperature or at an elevated temperature. Alternatively, the reduction may be carried out by the use of an alkali metal borohydride, for example sodium borohydride, in an inert diluent or solvent, for example methanol or ethanol, at a temperature of 0–25° C.

It is to be understood that, in the case where the naphthalene nucleus bears an acyloxy substituent, the last-named general process may result in the hydrolysis or aminolysis of the acyloxy substituent to the hydroxy substituent.

According to a further feature of the invention we provide a process for the manufacture of those of the naphthalene derivatives of the invention wherein the naphthalene nucleus bears a hydroxy substituent, which comprises the hydrolysis of the corresponding compound wherein the naphthalene nucleus bears an acyloxy substituent, or a salt thereof.

The hydrolysis may be effected by means of an alkaline hydrolytic agent, for example an alkali metal hydroxide, for example sodium hydroxide. The hydrolysis may be carried out in a diluent or solvent, for example aqueous methanol, and it may be accelerated or completed by the application of heat.

According to a further feature of the invention we provide a process for the manufacture of the naphthalene derivatives of the invention which comprises the reduction of a compound of the formula:

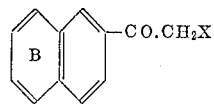

wherein X stands for a halogen atom, for example a chlorine or bromine atom, B has the meaning stated above, and the naphthalene nucleus optionally bears one or more additional substituents, followed by reaction of the reduction product so obtained with an amine of the formula $NH_2R^1$, wherein $R^1$ has the meaning stated above.

The last named reduction may be carried out by the use of an alkali metal borohydride, for example sodium borohydride, conveniently in an inert diluent or solvent, for example methanol, and at a temperature of 0–25° C. The reaction involving the amine may be carried out in an excess of the amine and/or in an inert diluent or solvent, and it may be accelerated or completed by the application of heat.

According to a further feature of the invention we provide a process for the manufacture of the naphthalene derivatives of the invention which comprises the interaction of a compound of the formula:

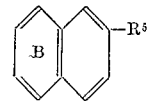

wherein $R^5$ stands for the group

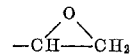

or $-CHOH \cdot CH_2X$, wherein B and X have the meanings stated above, and wherein the naphthalene nucleus optionally bears one or more additional substituents, with an amine of the formula $NH_2R^1$, wherein $R^1$ has the meaning stated above.

The last-named reaction may be carried out in the presence of an excess of the amine used as starting material and/or in the presence of an inert diluent or solvent. The reaction may be accelerated or completed by the application of heat.

The esters of the invention may be obtained by the intersection of the corresponding naphthalene derivative with a compound of the formula $R^2 \cdot CO \cdot Z$, wherein Z stands for a halogen atom, for example a chlorine or bromine atom, or for the group $-O \cdot CO \cdot R^2$, wherein $R^2$ has the meaning stated above.

The acylation may be carried out in a diluent or solvent which, in the case where an acid anhydride is used as acylation agent, may conveniently be the acid from which the anhydride is derived.

As stated above, the naphthalene derivatives of the present invention are of value in the treatment or prophylaxis of hypertension, phaeochromocytoma, and heart diseases, for example angina pectoris, cardiac arrhythmias and coronary insufficiency.

According to a further feature of the invention therefore, we provide pharmaceutical compositions comprising one or more naphthalene derivatives of the invention, or an ester or esters thereof, or a salt or salts thereof, together with a non-toxic, pharmaceutically-acceptable diluent or carrier therefor.

The said pharmaceutical compositions may be obtained by conventional means and using conventional excipients. As suitable compositions there may be mentioned, for example, tablets, capsules, aqueous or oily solutions, aqueous or oily suspensions, emulsions, injectable aqueous or oily solutions or suspensions, and dispersible powders.

The invention is illustrated but not limited by the following examples in which the parts are by weight:

Example 1

0.15 parts of Adams' catalyst and 4 parts of ethanol are shaken in an atmosphere of hydrogen at ambient temperature and atmospheric pressure until the absorption of hydrogen ceases. 0.5 part of 7-acetoxy-2-diazoacetylnaphthalene and 20 parts of acetone are added and the mixture is shaken in an atmosphere of hydrogen at ambient temperature and atmospheric pressure for 18 hours. The mixture is filtered and the acetone and ethanol are removed from the filtrate by evaporation. The residual oil is dissolved in 15 parts of ether and ethereal hydrogen chloride is added to the solution until the separation of solid is substantially complete. The mixture is filtered and the residual solid is crystallised from a mixture of methanol and ethyl acetate. There is thus obtained 1-(7-acetoxy-2-naphthyl)-2-isopropylaminoethanol hydrochloride, M.P. 212° C.

The 7-acetoxy-2-diazoacetylnaphthalene used as starting material may be obtained as follows:

A solution of 18 parts of 7-acetoxy-2-naphthoyl chloride in 200 parts of benzene is added gradually to a stirred solution of 7 parts of diazomethane 600 parts of ether at 0° C. The solution is kept at 0° C. during 18 hours and the ether, benzene and excess of diazomethane are evaporated. The residual solid is crystallised from ether, and there is thus obtained 7-acetoxy-2-diazoacetylnaphthalene, M.P 127–128° C. with decomposition.

7-acetoxy-2-naphthoyl chloride itself may be obtained as follows:

A mixture of 20 parts of 7-acetoxy-2-naphthoic acid, 20 parts of phosphorus pentachloride and 400 parts of light petroleum (B.P. 60–80° C.) is heated under reflux for 2 hours, and the mixture is then cooled and filtered. The solid residue is crystallised from light petroleum (B.P. 60–80° C.), and there is thus obtained 7-acetoxy-2-naphthoyl chloride, M.P. 125–126° C.

Example 2

A solution of 0.25 part of 1-(7-acetoxy-2-naphthyl)-2-isopropylaminoethanol hydrochloride in 8 parts of methanol, 5 parts of water and 0.5 part of 8 N-sodium hydroxide solution is heated under reflux for 1½ hours. The methanol is evaporated under reduced pressure, and 10 parts of water are added to the residual solution. The resulting solution is adjusted to pH 11 by the addition of N-hydrochloric acid. 3 parts of sodium chloride are added and the mixture is extracted 6 times with 20 parts of ether each time. The combined ethereal extracts are washed with 20 parts of saturated sodium chloride solution and then dried with anhydrous magnesium sulphate. The ether is evaporated and the solid residue is crystallised from ethyl acetate. There is thus obtained 1-(7-hydroxy - 2 - naphthyl) - 2 - isopropylaminoethanol, M.P. 165° C.

Example 3

0.2 part of Adams' catalyst and 8 parts of ethanol are shaken in an atmosphere of hydrogen at ambient temperature and atmospheric pressure until the absorption of hydrogen is complete. 0.65 part of 6-acetoxy-2-naphthylglyoxal hydrate and 5 parts of isopropylamine are added and the mixture is shaken in an atmosphere of hydrogen at ambient temperature and atmospheric pressure until the absorption of hydrogen ceases. The mixture is filtered and the ethanol and excess of isopropylamine are removed from the filtrate by evaporation. The residue is shaken together with 20 parts of N-hydrochloric acid and 20 parts of ether. The mixture is separated and the aqueous layer is adjusted to pH 11 by the addition of sodium hydroxide solution. The mixture is extracted six times with 20 parts of ether each time, and the combined ethereal extracts are washed with 10 parts of saturated sodium chloride solution and then dried with anhydrous magnesium sulphate. The ether is evaporated and the residual solid is crystallised from ethyl acetate. There is thus obtained 1-(6-hydroxy-2-naphthyl)-2-isopropylamino-ethanol, M.P. 170–171° C.

The 6-acetoxy-2-naphthylglyoxal hydrate used as starting material may be obtained as follows:

1 part of 6-acetoxy-2-acetylnaphthalene, 0.51 part of selenium dioxide and 15 parts of acetic acid are heated at 100° C. for 2 hours and then heated under reflux for 1 hour. The mixture is cooled and then filtered. 25 parts of ice are added to the filtrate, and when the ice has melted the mixture is filtered. The solid residue is crystallised from water, and there is thus obtained 6-acetoxy-2-naphthylglyoxal hydrate, M.P. 94–95° C.

Example 4

The process of Example 1 is repeated using a solution of 1.5 parts of 4-phenylbutan-2-one in 15 parts of ethanol in place of 20 parts of acetone. There is thus obtained 1 - (7 - acetoxy - 2 - naphthyl) - 2 - (1 - methyl - 3-phenylpropylamino)ethanol hydrochloride, M.P. 208–209° C.

Example 5

0.1 part of Adams' catalyst and 8 parts of ethanol are shaken in an atmosphere of hydrogen at ambient temperature and atmospheric pressure until the absorption of hydrogen is complete. 0.74 part of 7-acetoxy-2-naphthylglyoxal hydrate, 6 parts of t-butylamine and 20 parts of ethanol are added, and the mixture is shaken in an atmosphere of hydrogen at ambient temperature and atmospheric pressure until the absorption of hydrogen ceases. The mixture is filtered and the ethanol and the excess of t-butylamine are removed from the filtrate by evaporation. The residue is shaken together with 20 parts of N-hydrochloric acid and 20 parts of ether. The mixture is separated and the aqueous layer is made alkaline by the addition of 10 parts of 8 N-sodium hydroxide solution. The mixture is shaken with 20 parts of ether, the layers are separated and the aqueous layer is adjusted to pH 8 by the addition of 2 N-hydrochloric acid. The mixture is extracted six times with 20 parts of ether each time, the combined ethereal extracts are washed with 10 parts of saturated sodium chloride solution, and then dried with anhydrous magnesium sulphate. The ether is evaporated and the residual solid is then crystallised from ether. There is thus obtained 1-(7-hydroxy-2-naphthyl)-2-t-butylaminoethanol, M.P. 151–152° C.

The 7-acetoxy-2-naphthylglyoxal hydrate used as starting material may be obtained as follows:

A solution of 2 parts of 7-acetoxy-2-bromoacetylnaphthalene in 10 parts of dimethyl sulphoxide is kept at ambient temperature for 48 hours and then added to 50 parts of crushed ice. The mixture is allowed to warm to ambient temperature and is then filtered. The residual solid is crystallised from water, and there is thus obtained 7-acetoxy-2-naphthylglyoxal hydrate, M.P. 89–90° C.

The 7-acetoxy-2-bromoacetylnaphthalene used as starting material may be obtained as follows:

A solution of 5 parts of 7-acetoxy-2-diazoacetylnaphthalene in 150 parts of benzene is shaken 5 times with 40 parts of concentrated hydrobromic acid each time and for 5 minutes each time. The benzene solution is washed once with 25 parts of water, twice with 25 parts of 5% sodium carbonate solution and, finally, once with 25 parts of water. The benzene solution is dried with anhydrous magnesium sulphate and then evaporated to dryness. The residual solid is crystallised from ether, and there is thus obtained 7-acetoxy-2-bromoacetylnaphthalene, M.P. 95–96° C.

Example 6

A solution of 0.5 part of 2-bromo-1-(7-hydroxy-2-naphthyl)ethanol in 8 parts of isopropylamine is heated in a sealed vessel at 100° C. for 10 hours, and then the excess of isopropylamine is evaporated. The residual gum is stirred together with 20 parts of N-hydrochloric acid until the separation of solid is complete, and then the mixture is filtered. The filtrate is adjusted to pH 8 by the addition of sodium hydroxide solution. The mixture is extracted four times with 20 parts of ether each time, and the combined ethereal extracts are dried with anhydrous magnesium sulphate. The ether is evaporated and the residual solid is crystallised from ethyl acetate. There is thus obtained 1-(7-hydroxy-2-naphthyl)-2-isopropylaminoethanol, M.P. 165° C.

The 2-bromo-1-(7-hydroxy-2-naphthyl)ethanol used as starting material may be obtained as follows:

0.4 part of sodium borohydride is added during 15 minutes to a stirred solution of 1 part of 7-acetoxy-2-bromoacetylnaphthalene in 50 parts of methanol at 0° C. The mixture is stirred for 15 hours and then the methanol is evaporated. The residual solid is shaken with 50 parts of water and 50 parts of ether, the mixture is separated, and the ethereal solution is dried with anhydrous magnesium sulphate. The ether is evaporated, and the residual solid thus obtained consists of 2-bromo-1-(7-hydroxy-2-naphthyl)ethanol.

Example 7

1 part of sodium borohydride is added during 15 minutes to a stirred solution of 0.6 part of 7-acetoxy-2-naphthylglyoxal hydrate and 3 parts of cyclopentylamine in 60 parts of methanol at 0° C. The mixture is stirred for 3 hours and then the methanol and the excess of cyclopentylamine are evaporated. The residual gum is shaken together with 40 parts of N-hydrochloric acid and 15 parts of chloroform. The mixture is separated, and the aqueous layer is adjusted to pH 11 by the addition of sodium hydroxide solution. The mixture is extracted 3 times with 20 parts of chloroform each time and the combined chloroform extracts are washed once with 20 parts of saturated sodium chloride solution and then dried with anhydrous magnesium sulphate. The chloroform is evaporated and the residual solid is crystallised from ethyl acetate. There is thus obtained 2-cyclopentylamino-1-(7-hydroxy - 2 - naphthyl)ethanol, M.P. 162° C.

Example 8

0.1 part of Adams' catalyst and 4 parts of ethanol are shaken in an atmosphere of hydrogen at ambient temperature and atmospheric pressure until the absorption of hydrogen ceases. 1 part of 7-acetoxy-2-diazoacetylnaphthalene, 10 parts of 2-nonanone and 12 parts of ethanol are added, and the mixture is shaken in an atmosphere of hydrogen at ambient temperature and atmospheric pressure for 18 hours. The mixture is filtered and the ethanol is removed by evaporation. The residual oil is shaken together with 20 parts of N-hydrochloric acid and 25 parts of ether. The mixture is separated and the aqueous solution is extracted twice more with 25 parts of ether each time. The combined ethereal solutions are washed once with 20 parts of saturated sodium chloride solution and then dried over anhydrous magnesium suphate. The ether is evaporated and the residual oil is stirred for 5 minutes together with 40 parts of light petroleum (B.P. 40–60° C.). The light petroleum solution is decanted from insoluble material. The insoluble material is stirred five more times together with 40 parts of light petroleum (B.P. 40–60° C.) each time as described above. The material which is insoluble in light petroleum is dissolved in 8 parts of ethyl acetate, and the solution is kept at 0° C. until the separation of solid is substantially complete. The mixture is filtered, and the residual solid is crystallised from a mixture of methanol and ethyl acetate. There is thus obtained 1-(7-acetoxy-2-naphthyl)-2-(1 - methyloctylamino)ethanol hydrochloride, M.P. 161–162° C.

Example 9

0.15 part of Adams' catalyst and 4 parts of acetone are shaken together in an atmosphere of hydrogen at ambient temperature and atmospheric pressure until the platinum oxide is reduced to platinum. 0.25 part of 7-acetoxy-2-diazoacetylnaphthalene and 8 parts of acetone are added, and the mixture is shaken in an atmosphere of hydrogen at ambient temperature and atmospheric pressure for 18 hours. The mixture is filtered and the excess acetone is removed from the filtrate by evaporation. The residual oil is stirred together with 10 parts of ether, and then the mixture is filtered. Ethereal hydrogen chloride is added to the filtrate until the separation of solid is substantially complete. The mixture is filtered and the residual solid is crystallised from a mixture of methanol and ethyl acetate. There is thus obtained 1-(7-acetoxy-2-naphthyl) - 2-isopropylaminoethanol hydrochloride, M.P. 212° C.

Example 10

0.2 part of Adams' catalyst and 4 parts of methanol are shaken in an atmosphere of hydrogen at ambient temperature and atmospheric pressure until the absorption of hydrogen is complete. 0.63 part of 6,7-dimethoxy-2-naphthylglyoxal hydrate, 8 parts of isopropylamine and 20 parts of methanol are added, and the mixture is shaken in an atmosphere of hydrogen at ambient temperature and atmospheric pressure until the absorption of hydrogen ceases. The mixture is filtered and the methanol and the excess of isopropylamine are removed from the filtrate by evaporation. The residue is shaken together with 20 parts of N-hydrochloric acid and 20 parts of ether. The mixture is separated and the aqueous layer is made alkaline by the addition of 10 parts of 8 N-sodium hydroxide solution. The mixture is extracted 3 times with ether, using 20 parts of ether each time. The combined ethereal extracts are worked once with 20 parts of water, dried over anhydrous magnesium sulphate, and then the ether is evaporated. The residual solid is crystallised from ethyl acetate, and there is thus obtained 1-(6,7-dimethoxy-2-naphthyl) - 2-isopropylaminoethanol, M.P. 138–139° C.

The 6,7-dimethoxy-2-naphthylglyoxal hydrate used as starting material may be obtained as follows:

1 part of 2-acetyl-6,7-dimethoxynaphthalene, 0.51 part of selenium dioxide and 5 parts of acetic acid are heated at 100° C. for 3 hours. The mixture is cooled and then filtered. The filtrate is added to 200 parts of water and the solid which separates is isolated by filtering the mixture. The residual solid is crystallised from water, and there is thus obtained 6,7-dimethoxy-2-naphthylglyoxal hydrate, M.P. 113–114° C.

Example 11

0.5 part of sodium borohydride is added during 1 hour to a stirred suspension of 0.63 part of 6,7-dimethoxy-2-naphthylglyoxal hydrate and 8 parts of t-butylamine in 20 parts of methanol at 0° C. The mixture is stirred for 18 hours and then the methanol and excess t-butylamine are removed by evaporation. The residue is shaken together with 35 parts of N-hydrochloric acid and 20 parts of ether. The mixture is separated and the aqueous layer is made alkaline by the addition of 20 parts of 8 N-sodium hydroxide solution. The mixture is extracted 3 times with ether using 20 parts of ether each time. The combined ethereal extracts are washed once with 20 parts of water, dried over anhydrous magnesium sulphate and then the ether is evaporated. The residual solid is crystallized from ethyl acetate and there is thus obtained 1-(6,7-dimethoxy-2-naphthyl)-2-t-butylaminoethanol, M.P. 177° C.

Example 12

0.15 part of Adams' catalyst and 10 parts of acetic acid are shaken in an atmosphere of hydrogen at ambient temperature and atmospheric pressure until the absorption of hydrogen ceases. 0.25 part of 7-acetoxy-2-diazoacetylnaphthalene, 4 parts of acetone and 5 parts of acetic acid are added, and the mixture is shaken in an atmosphere of hydrogen at ambient temperature and atmospheric pressure until the absorption of hydrogen ceases. The mixture is filtered and the acetic acid and excess of acetone are removed by evaporation under reduced pressure. The residual oil is dissolved in 10 parts of ether, and ethereal hydrogen chloride is added until the separation of solid is substantially complete. The mixture is filtered and the residual solid is crystallized from a mixture of methanol and ethyl acetate. There is thus obtained 1-(7-acetoxy-2-naphthyl)-2-isopropylaminoethanol hydrochloride, M.P. 212° C.

Example 13

1 part of sodium borohydride is added during 10 minutes to a stirred solution of 0.5 part of 6-(or 7-)acetoxy-7-(or 6-)methoxy-2-naphthylglyoxal hydrate and 4 parts of isopropylamine in 80 parts of methanol at 0° C. The mixture is stirred for 2 hours and then the methanol and the excess of isopropylamine are evaporated. The residual gum is shaken together with 40 parts of N-hydrochloric acid and 15 parts of chloroform. The mixture is separated and the aqueous layer is adjusted to pH 11 by the addition of sodium hydroxide solution. The mixture is extracted 3 times with 20 parts of chloroform each time and the combined chloroform extracts are washed once with 20 parts of saturated sodium chloride solution and then dried with anhydrous magnesium sulphate. The chloroform is evaporated and the residual solid is crystallised from ethyl acetate. There is thus obtained 1-[6-(or 7-)hydroxy-7-(or 6-) methoxy-2-naphthyl]-2-isopropylaminoethanol, M.P. 182–183° C.

The 6-(or 7-) acetoxy-7-(or 6-)methoxy-2-naphthylglyoxal hydrate used as starting material may be obtained as follows:

1 part of 6-(or 7-)acetoxy-2-acetyl-7-(or 6-)methoxynaphthalene, 0.45 part of selenium dioxide and 20 parts of acetic acid are heated at 100° C. for 2 hours and then heated under reflux for 1 hour. The mixture is cooled and then filtered. The filtrate is added to 100 parts of crushed ice, the mixture is allowed to warm to ambient temperature and then extracted with 100 parts of ether in 3 portions. The combined ethereal extracts are washed with 20 parts of water, dried over anhydrous magnesium sulphate and then the ether is evaporated. A trace of acetic acid in the residual oil is removed by evaporation under reduced pressure. The residual oil consists of 6-(or 7-)acetoxy-7-(or 6-)methoxy-2-naphthylglyoxal hydrate.

The 6-(or 7-)acetoxy-2-acetyl-7-(or 6-)methoxynaphthalene used as starting material may be obtained as follows:

A solution of 3 parts of 2-acetyl-6-(or 7-) hydroxy-7-(or 6-)methoxynaphthalene in 20 parts of acetic anhydride and 6 parts of pyridine is kept at ambient temperature for 18 hours. The mixture is filtered and the residual solid is crystallised from methanol. There is thus obtained 6-(or 7-)acetoxy-7-(or 6-)methoxy-2-acetylnaphthalene, M.P. 138° C.

The 2-acetyl-6-(or 7-)hydroxy-7-(or 6-)methoxynaphthalene used as starting material may be obtained as follows:

27 parts of finely powdered aluminum chloride are added during 30 minutes to a solution of 10 parts of 2-acetyl-6,7-dimethoxynaphthalene in 100 parts of xylene at 100° C. The mixture is heated at 100° C. for 90 minutes and is then cooled. 250 parts of ice are added to the stirred mixture, and the resulting mixture is allowed to warm to ambient temperature and is then filtered. Both the solid residue and the filtrate are retained. The solid residue is washed with 200 parts of chloroform and the chloroform washings are retained. The filtrate is steam distilled to remove xylene, and is then cooled and extracted with 240 parts of chloroform in 3 equal portions. These three chloroform extracts are combined with the above-mentioned chloroform washings, and the combined chloroform solution is shaken together with 1 litre of 2 N-sodium hydroxide solution. The mixture is separated and the aqueous phase is acidified by the addition of concentrated hydrochloric acid. The mixture is extracted with 450 parts of chloroform in 3 equal portions, washed once with 50 parts of water, dried over anhydrous magnesium sulphate, and then the chloroform is evaporated. The residual solid is crystallised from methanol, and there is thus obtained 2-acetyl-6-(or 7-)hydroxy-7-(or 6-)methoxynaphthalene, M.P. 183–184° C.

Example 14

89 parts of spray-dried lactose are passed through a 60-mesh sieve and then mixed with 5 parts of maize starch and 1 part of magnesium stearate. The mixture is passed through a 60-mesh sieve and then thoroughly mixed with 10 parts of 1-(7-hydroxy-2-naphthyl)-2-isopropylaminoethanol. The mixture is passed through a 60-mesh sieve, and then compressed into tablets by known means. There are thus obtained tablets which are suitable for oral use for therapeutic purposes.

What we claim is:

1. A compound selected from the group consisting of naphthalene derivatives of the formula:

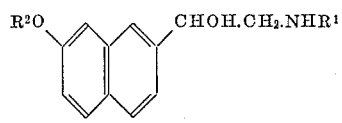

wherein $R^1$ is selected from the group consisting of alkyl of not more than 10 carbon atoms, 2-hydroxy-1,1-dimethylethyl, cycloalkyl of not more than 6 carbon atoms, allyl, and phenylalkyl of not more than 10 carbon atoms, and $R^2$ is selected from the group consisting of hydrogen and alkanoyl of not more than 5 carbon atoms, and pharmaceutically-acceptable acid-addition salts thereof.

2. A compound as claimed in claim 1 and selected from the group consisting of 1-(7-acetoxy-2-naphthyl)-2-isopropylaminoethanol, 1-(7-hydroxy-2-napthyl)-2-isopropylaminoethanol, and pharmaceutically-acceptable acid-addition salts thereof.

3. A compound as claimed in claim 1 and selected from the group consisting of 1-(7-acetoxy-2-naphthyl)-2-(1-methyl-3-phenylpropylamino)ethanol, 1-(7-hydroxy-2-naphthyl)-2-t-butylaminoethanol, 2-cyclopentylamino-1-(7-hydroxy-2-naphthyl)ethanol, 1-(7-acetoxy-2-naphthyl)-2-(1-methyloctylamino)ethanol and pharmaceutically-acceptable acid-addition salts thereof.

4. A compound as claimed in claim 1 wherein $R^2$ is alkanoyl of not more than 5 carbon atoms.

References Cited

UNITED STATES PATENTS 3,215,732  11/1965  Stephenson _____ 260—501
3,312,733  4/1967  Howe _____ 260—501

FOREIGN PATENTS 909,357  10/1962  Great Britain.

LORRAINE A. WEINBERGER, Primary Examiner

M. G. BERGER, Assistant Examiner

U.S. Cl. X.R.

260—141, 477, 486, 490, 501.17, 570.6, 592, 619;
424—307, 330